(No Model.)
A. V. FAUSEK.
PISTON PACKING.
No. 358,442. Patented Mar. 1, 1887.
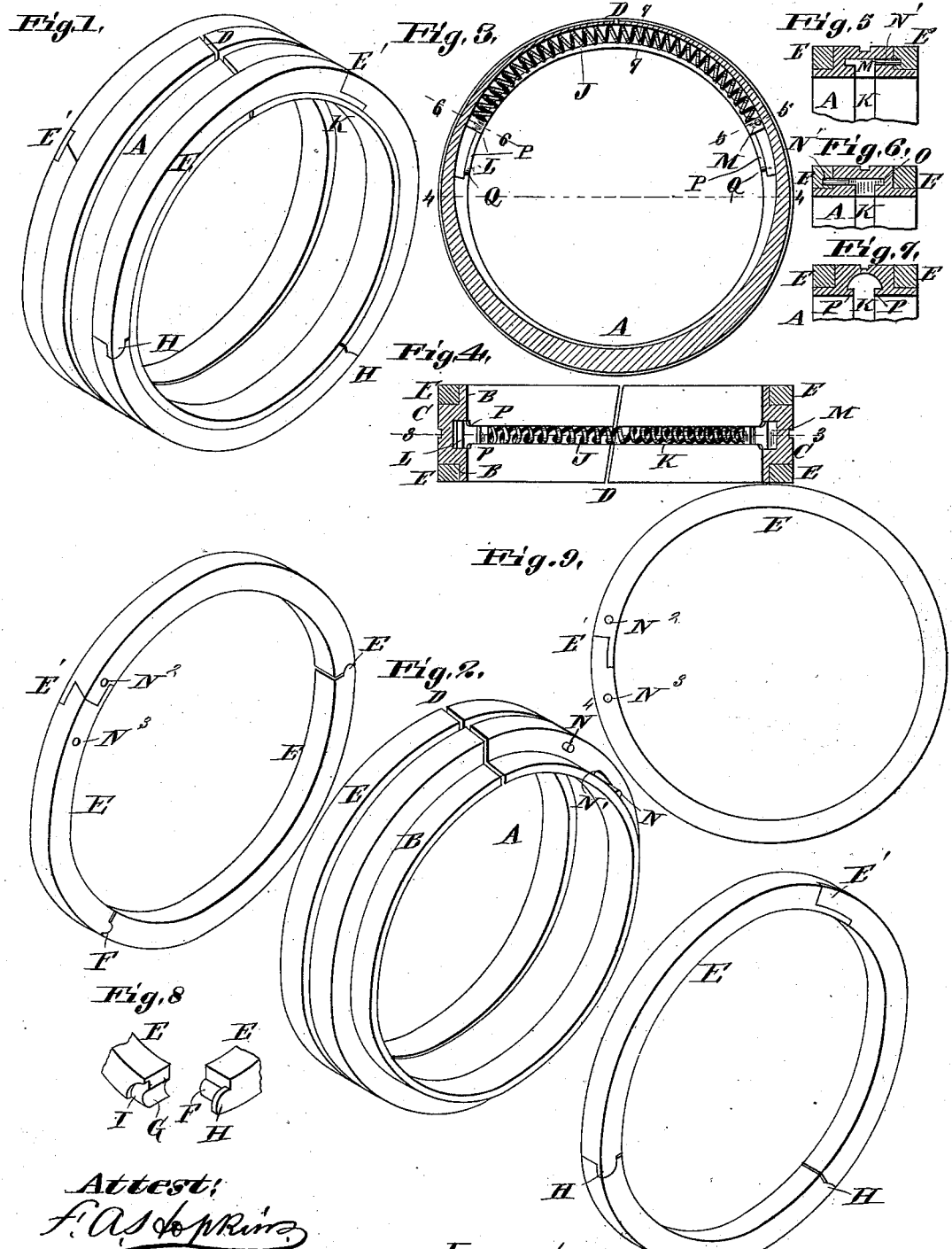
Inventor,
Alex. V. Fausek,
By Knight Bros
attys
Attest:

UNITED STATES PATENT OFFICE.

ALEXANDER V. FAUSEK, OF ST. LOUIS, MISSOURI.

PISTON-PACKING.

SPECIFICATION forming part of Letters Patent No. 358,442, dated March 1, 1887.

Application filed March 8, 1886. Serial No. 194,470. (No model.)

*To all whom it may concern:*

Be it known that I, ALEXANDER V. FAUSEK, of the city of St. Louis, in the State of Missouri, have invented a certain new and useful Improvement in Piston-Packing, of which the following is a full, clear, and exact description, reference being had to the accompanying drawings, forming part of this specification, and in which—

Figure 1 is a perspective view of my improved packing. Fig. 2 is a similar view showing the rings removed from the bull-ring. Fig. 3 is a section taken on line 3 3, Fig. 4. Fig. 4 is a section taken on line 4 4, Fig. 3. Figs. 5, 6, and 7 are sections taken, respectively, on lines 5 5, 6 6, and 7 7, Fig. 3. Fig. 8 is a detail view illustrating the form of joint made in the sectional packing-rings. Fig. 9 is a side view of a packing ring made in one part.

My invention relates to an improved piston-packing; and my invention consists in features of novelty, hereinafter fully described, and pointed out in the claims.

Referring to the drawings, A represents the bull-ring, which is thicker at its lower part than at its upper part to compensate for wear. It has an annular flange, B, at each side of the central or body part, C, and over these flanges fit the packing-rings. It (the bull-ring) is also, preferably, split at D, as usual, and the bull-ring is provided with an annular groove, c, which stays the escape, not only of the water of condensation, but also of the lubricant, which act as a packing to prevent the escape of steam past the piston.

My invention consists in the manner of expanding the packing-rings and connecting them to the bull-ring.

E represents the packing-rings, which may either be made in sections, as shown, or may be made in a complete ring, as shown in Fig. 9. Where the rings are made in sections, I prefer to connect the sections by a joint, illustrated in Fig. 8, the end of one section having a round bearing, F, that fits in a similar socket, G, in the adjacent end of the next section, and the end of the first-mentioned section has a projection, H, that fits in a recess, I, in the adjacent end of the second section. This connection prevents any outward or inward movement of one section upon the other, which is due to the projection F and sockets G, and also any lateral movement of one section upon the other, which is due to the projection H and recess I.

When the rings are placed upon the flanges B of the bull-ring, they are expanded and kept expanded by means of a spring, J, fitting in a groove, K, made in the inner face of the bull-ring, and held between blocks L and M, that slide in the groove K and are held therein by their heads O, (see Fig. 6,) which are larger than the bottom of the slot or groove K, the bottom of the groove having extensions P, (see Figs. 5, 6, and 7,) which extend around the ring from the points indicated by the letter Q in Fig. 3. The heads are slipped into the groove K from the ends of the projections P.

Each block L and M has a pin, N, that extends through a slot, N', made in the bull-ring, extending along the body of the bull-ring and entering perforations or holes $N^2$ on one side of the joint E' of the packing-rings. On the other side of the joint E' of the rings is a hole, $N^3$, to receive stationary pins $N^4$ on the bull-ring.

The pins N are forced inward slightly, when the packing-rings are put on, and when the rings are in place (being held from circular movement on the flange B by the pins $N^4$) the pressure of the spring J will act to expand them, and keep them expanded upon the bull-ring, thus compensating for wear.

The holes $N^2$ and $N^3$ in the rings are shown most plainly in the left-hand side of Figs. 2 and 9, both rings having like holes to receive like pins.

In Fig. 9 the joint of the ring is shown closed and in working position, and therefore the ring is shown in a complete circle. Before the ring is put in place this joint is open, and the ring is then of a slightly non-circular shape. In making this ring it is turned true after the cut at the joint is made.

I am aware that a solid piston has been provided with a peripheral groove, and do not claim such as my invention. Nor do I claim, broadly, a bull-ring for pistons having such a groove, my invention being limited to an expansible bull-ring having a groove for catching the water of condensation, as well as the lubricant, for assisting in packing the piston. Such a groove would not operate to produce this result unless the piston or bull-ring in which it was formed were made expansible.

I claim as my invention—

1. In a piston-packing, the combination of the bull-ring, spring fitting in a groove in the ring, and rings fitting on the bull-ring and expanded by the spring, to which they are connected by blocks and pins, substantially as set forth.

2. In a piston-packing, the combination of a grooved bull-ring, spring fitting in the groove, movable blocks at each end of the spring, and packing-rings fitting upon flanges of the bull-ring and connected to the bull-ring and the blocks by means of pins, substantially as and for the purpose set forth.

3. In a piston-packing, the combination of the bull-ring having a groove with extensions P, spring fitting in said groove, blocks fitting in said groove and held from outward movement by the projections P, pins on the blocks fitting in slots in the bull-ring, and packing-rings having perforations fitting over the pins on the bull-ring and the pins on the sliding blocks, substantially as shown and described, for the purpose set forth.

4. In a piston-packing, the combination of the bull-ring, spring secured to the bull-ring, and packing-rings, the packing-rings being connected to the spring so as to be expanded thereby, substantially as shown and described, for the purpose set forth.

5. A packing-ring formed in sections and having a single expanding joint at E, and turned true after the joint is made, the sections being joined by recesses I G and projections F H, as set forth.

6. A packing-ring made in sections, the sections being joined by recesses I G and projections F H, as set forth.

7. The combination, with a bull-ring having a groove on its inner surface and the expansible packing-ring surrounding said bull-ring, of a coiled compression-spring fitted in said groove and connected with said packing-ring, substantially as set forth.

8. A piston having a split expansible bull-ring with a groove in the periphery thereof, substantially as set forth.

ALEX. V. FAUSEK.

In presence of—
GEO. H. KNIGHT,
SAML. KNIGHT.